United States Patent [19]

Akiyama et al.

[11] Patent Number: 4,656,377
[45] Date of Patent: Apr. 7, 1987

[54] TACHOGENERATOR HAVING A MAGNETORESISTANCE STATOR COIL

[75] Inventors: Naoki Akiyama, Kanagawa; Kenichi Kitamura; Eiichi Kotake, both of Fujieda, all of Japan

[73] Assignee: Victor Company of Japan, Ltd., Japan

[21] Appl. No.: 695,816

[22] Filed: Jan. 28, 1985

[30] Foreign Application Priority Data

Jan. 30, 1984 [JP] Japan .................................. 59-14922
Jan. 19, 1985 [JP] Japan .............................. 60-6165[U]

[51] Int. Cl.$^4$ ........................ G01B 7/24; H01L 43/08; H02K 11/00
[52] U.S. Cl. .................................... 310/68 R; 310/72; 324/208; 338/32 R
[58] Field of Search .................... 310/45, 67 R, 68 R, 310/72, 168, 169, 170, 171, 184, 179, 180, 207, 208, 268, 156; 324/208, 252; 361/240; 338/32 R, 32 H, 116

[56] References Cited

U.S. PATENT DOCUMENTS

| 3,162,804 | 12/1964 | Parsons | 323/94 |
| 4,109,170 | 8/1978 | Fujita et al. | 310/68 R |
| 4,359,657 | 11/1982 | Matsumoto et al. | 310/156 |
| 4,418,372 | 11/1983 | Hayashida et al. | 324/252 |
| 4,488,076 | 12/1984 | MaCleod | 310/171 |
| 4,490,674 | 12/1984 | Ito | 324/208 |
| 4,506,217 | 3/1985 | Rothley et al. | 324/174 |
| 4,599,561 | 7/1986 | Takahashi et al. | 338/32 R |

FOREIGN PATENT DOCUMENTS

| 1276346 | 8/1968 | Fed. Rep. of Germany . |
| 2532574 | 2/1977 | Fed. Rep. of Germany . |
| 2647687 | 4/1977 | Fed. Rep. of Germany . |

Primary Examiner—Patrick R. Salce
Assistant Examiner—D. L. Rebsch
Attorney, Agent, or Firm—Lowe, Price, LeBlanc, Becker & Shur

[57] ABSTRACT

A tachogenerator has a magnetoresistance film coil formed on a stator surface along a circular path concentric with a rotor axis. The coil has a spatially periodic structure, with multiple spaced-apart lateral components series connected with longitudinal components. The stator surface is opposite to a rotor surface having multiple equiangularly spaced magnetic pole faces with alternately opposite polarities. Current passed through the coil develops voltage variations. Undesirable small voltage variations resulting from manufacturing tolerances are averaged to zero at the coil output terminals.

13 Claims, 10 Drawing Figures

TACHOGENERATOR HAVING A MAGNETORESISTANCE STATOR COIL

BACKGROUND OF THE INVENTION

The present invention relates to a tachogenerator.

Tachogenerators currently in use include a type of device having a single magnetoresistance element mounted in proximity to rotor pole faces. While this type of tachogenerator is advantageous for detecting extremely low angular velocities due to the speed-independent nature of the magnetoresistance element, there are undesirable voltage fluctuations resulting from mechanical tolerances. This significantly degrades the quality of products and prevents the tachogenerator from meeting requirements imposed in high-precision speed-control applications.

SUMMARY OF THE INVENTION

Therefore an object of the invention is to provide a precision tachogenerator.

This object is obtained by forming a magnetoresistance film on a surface of the stator along a path extending concentrically about the rotor axis over an arc of at least 180 degrees. The film has a spatially periodic structure having multiple angularly spaced-apart, lateral components series connected with intermediate longitudinal components between output terminals. The lateral components of the magnetoresistance coil average out voltage variations resulting from manufacturing tolerances, so that errors are cancelled at the terminals of the coil.

According to one feature of the invention, the tachogenerator of the invention has a flat pancake configuration. This is achieved by forming the coil on a flat surface of the stator in a periodic structure having multiple radial components and forming the pole faces on a flat surface in opposition to the surface of the stator.

According to a further feature of the invention, undesirable voltage variations which occur as a result of electromotive forces at one-half the frequency of resistance changes are eliminated by arranging the lateral components of the coil so that pairs of adjacent components are spaced apart an even integral multiple of the angular pole face spacing.

BRIEF DESCRIPTION OF THE DRAWINGS

The present invention will be described in further detail with reference to the accompanying drawings, in which.

DETAILED DESCRIPTION

Figure 1:
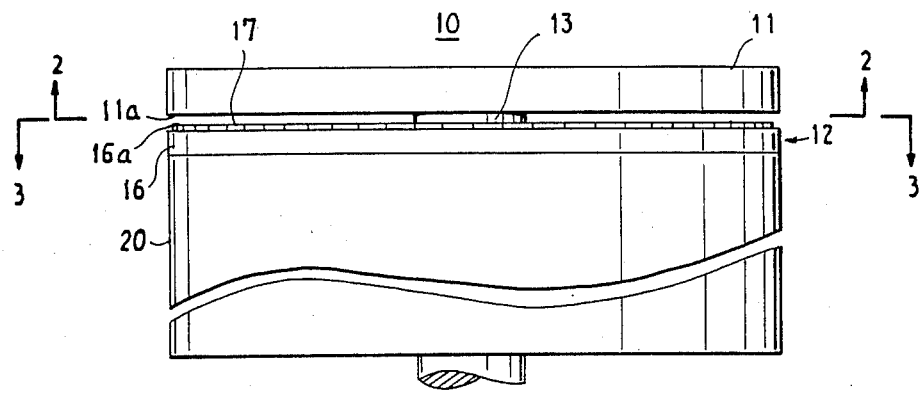
FIG. 1 is a view in elevation of a tachogenerator according to one embodiment of the invention shown attached to a motor.
Figure 2:
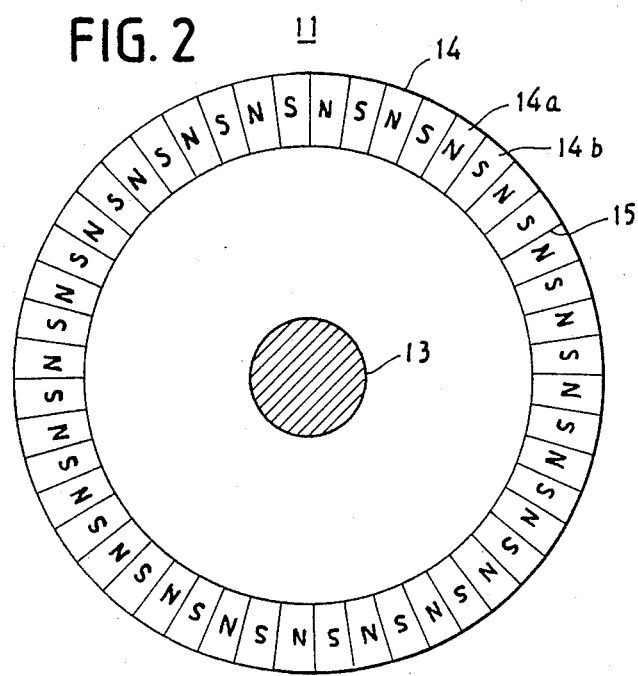
FIG. 2 is a cross-sectional view of the pole faces as taken along the lines 2—2 of FIG. 1.

A tachogenerator 10 represented in FIG. 1 is attached to an electric motor 20.

Tachogenerator 10 comprises a rotor coil and a stator 12. Rotor 11 is mounted on motor shaft 13. Rotor 11 is shaped as a disc having plural equally divided radial segments 14 which are alternately oppositely magnetized in the direction of the axis of shaft 13 to present pole faces 14a and 14b in a common flat plane 11a which is parallel to the surface of stator 12. Magnetic boundaries between adjacent pole faces thus extend radially and are angularly spaced apart at equal intervals.

Stator 12 comprises an annular insulative support 4 formed of epoxy resin or Bakelite mounted on motor 20. Shaft 3 extends through hole 21 and is secured to rotor 11 of motor 20 so that pie face plane 11a is axially spaced in opposition to the surface 16a of support 16.

Figure 3:
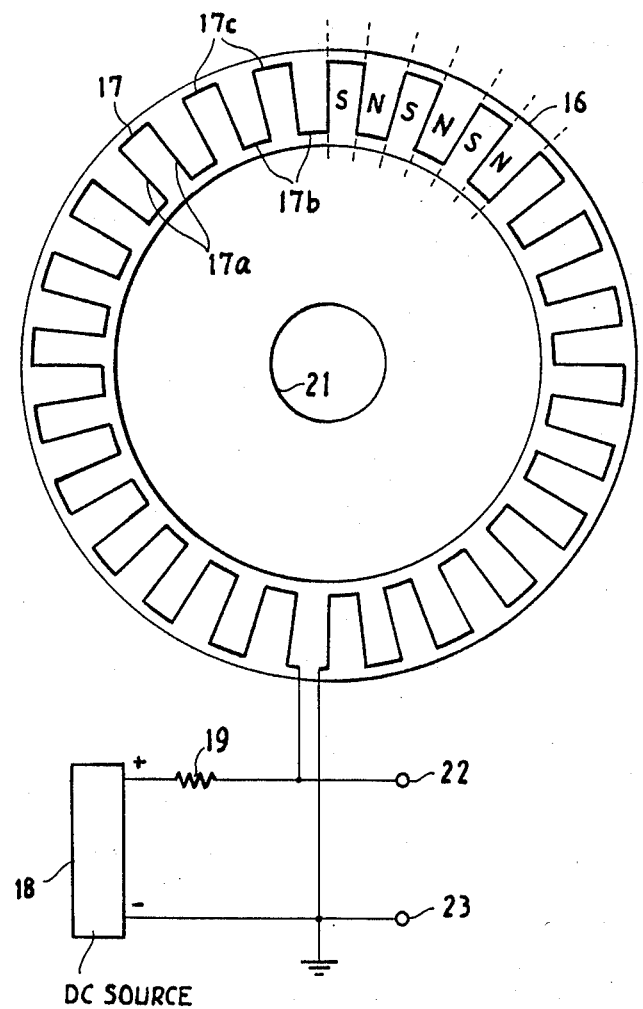
FIG. 3 is a cross-sectional view of a coil structure of the first embodiment, as taken along the lines 3—3 of FIG. 1 and a current supply and voltage sensing circuit.

On the surface of support 16 is a ferromagnetic strip 17 film of magnetoresistance material such as permalloy, nickel-cobalt alloy or the like. Such ferromagnetic material is deposited on support 16 as a single-turn flat coil having a thickness of from 500 Angstrom units to 1 micrometer using electroless plating, sputtering, or vacuum evaporation technique. The magnetoresistance material is deposited along a path concentric with the axis of rotation of rotor 11 in a spatially periodic structure having multiple lateral components 17a which extend radially and equiangularly and are spaced apart and connected in series with outer and inner intermediate longitudinal, or arcuate components 17b, 17c. Radial components 17a are spaced apart at equal angular intervals at which the pole faces are spaced apart so that each radial component coincides axially with each of the magnetic boundaries between the pole faces. As illustrated in FIG. 3, current is supplied from the positive terminal of a DC voltage source 18 through a load impedance 19 to coil 17 and thence to the negative terminal of the voltage source to detect voltage variations.

Changes in resistance occur in radial components 17a in proportion to the magnetic field strength, which changes combine to produce a total resistance change which generally takes the shape of a substantially constant-amplitude sinusoid varying at a rate proportional to the rotation speed of rotor 11. Voltages are also induced by an electromotive force (EMF) in radial components 17a in proportion to the rate of change in magnetic field strength, which voltages combine to produce a sinusoidal voltage having an amplitude and frequency that varies in proportion to the rotor rotation speed. The frequency of the EMF is one-half the frequency of the resistance variations. These voltage variations are summed and appear across terminals 22 and 23.

Because the voltage variations are summed, the tachogenerator of the invention averages out small undesired variations which might occur as a result of manufacturing tolerances. Because of the multiple lateral components 17a corresponding with multiple pole faces 14a, 14b, coil 17 extends over an arc of at least 180 degrees. In a practical embodiment, the number of pole faces range from 60 to 1000 depending on the tachogenerator diameter and the degree of precision required.

When the rotor speed is relatively low, the induced EMF components have a relatively small magnitude, whereby the magnitude of voltage variations attributed to the resistance changes is much greater than the EMF voltage components. Since the resistance is predominant at low speeds, the tachogenerator of the invention provides constant-amplitude voltage variations at twice the frequency of the EMF. This is particularly advantageous to high precision angular velocity or angular position sensors for low speed applications. At high speeds, on the other hand, the induced EMF components, which are proportional to rotor speed, become dominant and increase in magnitude. High amplitude voltage variations are thus available. Although the frequency is one-half the frequency of the resistance change, the high speed operation may compensate for the frequency reduction.

The embodiment of FIG. 1 is advantageous for forming the coil 17 in an efficient manner and provides a flat, pancake-like construction.

Figure 4:
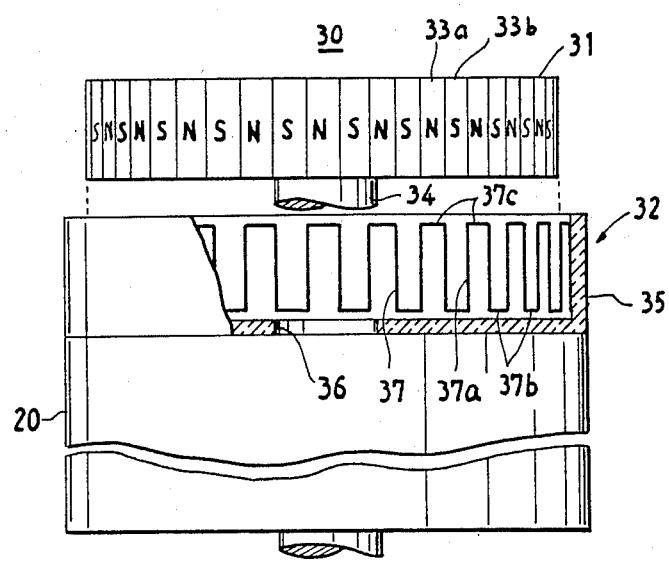
FIG. 4 is an elevation view of an alternative embodiment of the tachogenerator of FIG. 1, showing the rotor removed from the stator to make the inside visible.
Figure 5:
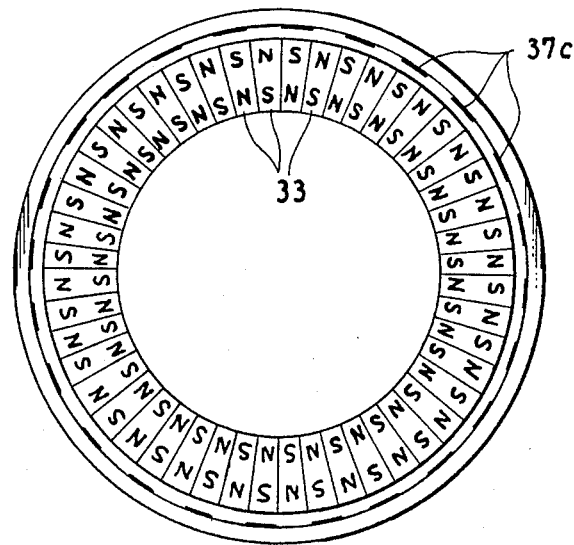
FIG. 5 is a top plan view of the tachogenerator of FIG. 4.

However, it is also possible to arrange the pole faces and lateral coil components on opposed cylindrical surfaces, as illustrated in FIGS. 4 and 5. A tachogenerator 30 of the cylindrical arrangement comprises a rotor 31 and a stator 32. Rotor 31 is a disc having an axial dimension sufficient to induce magnetic resistance changes in the stator coil. Rotor disc has plural equally angularly spaced-apart radially magnetized segments 33 which are alternately oppositely poled as seen in FIG. 5, so that pole faces 33a and 33b are presented on the cylindrical surface of the rotor disc. Rotor 31 is mounted on shaft 34 of the motor 20.

Stator 32 is formed of an insulative cylindrical support 35 having a center hole 36 through which the rotor shaft 34 extends into the motor, so that the cylindrically arranged pole faces of rotor 31 are uniformly spaced in opposition to the inner cylindrical surface of stator support 35 on which is formed a magnetoresistance coil 37. As in the previous embodiment, coil 37 is a spatially periodic structure having multiple equiangularly spaced-apart lateral components 37a which extend parallel with the axis of the rotation of rotor 31 and are connected in series with upper and lower intermediate longitudinal components 37b and 37c, the axial components 37a being provided in equal number to the pole faces 33. The coil 37 is deposited in the manner described in the previous embodiment. A current supply and voltage sensing circuit of FIG. 3 is connected to the coil 37 as in FIG. 3.

Figure 6:
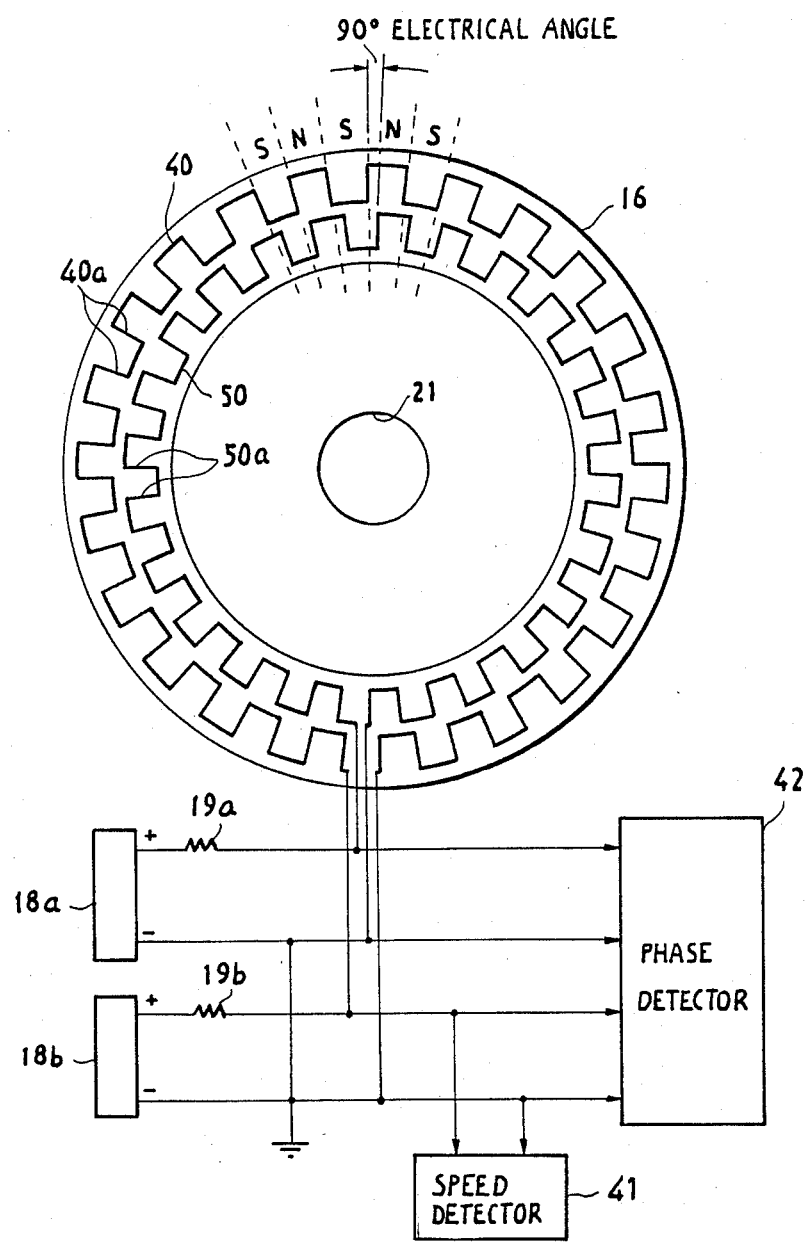
FIG. 6 is a plan view of a dual coil structure according to a second embodiment of the invention and a speed sensing and phase detecting circuit associated therewith.

In cases where it is desired to detect the direction of rotation of motor 20, the dual coil structure shown in FIG. 6 is used instead of the single coil structure of FIG. 3. The dual coil structure comprises an outer coil 40 and an inner coil 50 having radial components 50a equal in number to the radial components 40a of outer coil 40. Radial components 50a are angularly displaced by 90-degree electrical angle, or ¼ the angular spacing between adjacent pole faces, with respect to radial components 40a. Inner coil 50 is coupled to voltage source 18a through load resistance 19a and outer coil 40 is coupled to voltage source 18b through load resistance 19b. A speed detector 41 may either be coupled to the outputs of the inner or outer coil. The direction of rotation of motor 20 is detected by coupling a phase detector 42 to the outputs of inner and outer coils.

In a modification of the present invention, the lateral components of the coil structure are arranged in pairs and the lateral components in each pair are angularly spaced apart from each other by an even integral multiple of the angular spacing of the pole faces to cause EMF-induced currents to develop in opposite directions in the lateral components of each pair.

Figure 7:
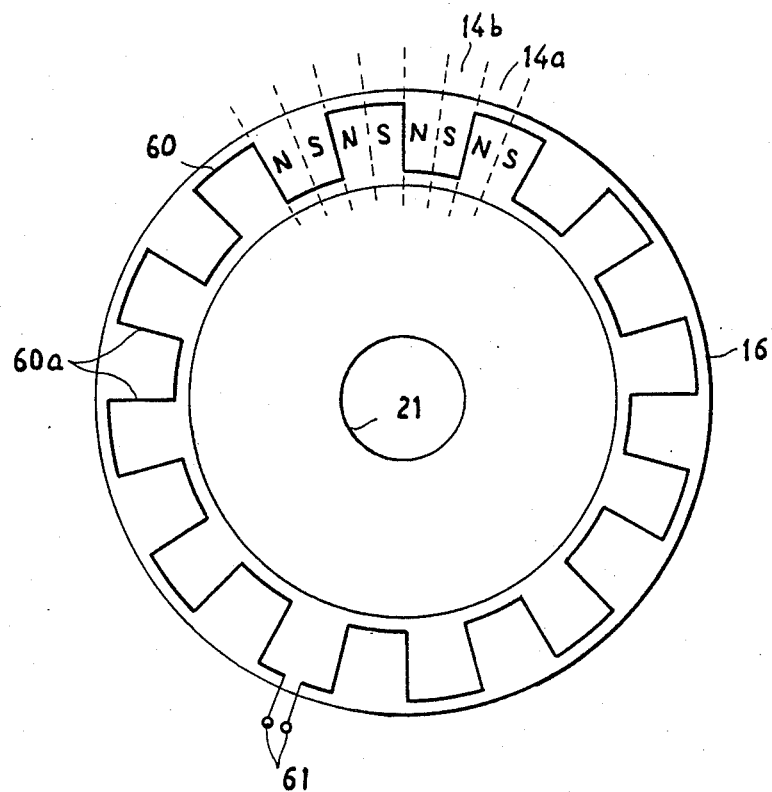
FIG. 7 is a plan view of a single coil structure according to a third embodiment of the invention.
Figure 8:
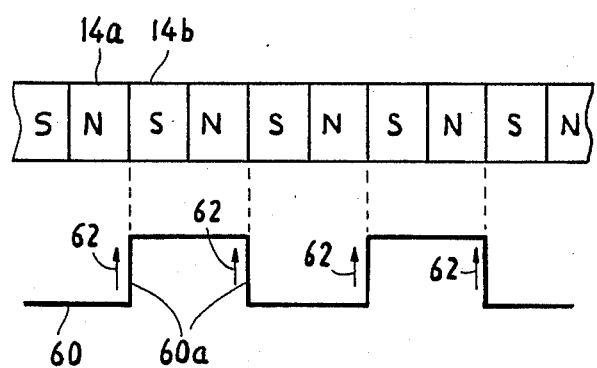
FIG. 8 is a view of the pole faces and a section of the coil of FIG. 7 in developed form.

FIG. 7 is a top view of coil 60 in such a modification. Coil 60 has multiple radially extending lateral components 60a which are formed into pairs. The lateral components of each pair are angularly spaced from each other by twice the angular spacing of pole faces 14a, 14b and the lateral components of adjacent pairs are angularly spaced from each other by twice the angular spacing of the pole faces. A positional relationship between pole faces 14a, 14b and coil 60 is shown in developed form in FIG. 8. The EMF voltages induced in radial components 60a of each pair have the same polarities as indicated by arrows 62 and hence cancel each other out. The output signal available from terminals 61 contains only the voltage variations resulting from resistance changes. Because the induced EMF components are cancelled, the output voltage is a purely sinusoidal waveform having a constant amplitude independent of the rotor speed.

Figure 9:
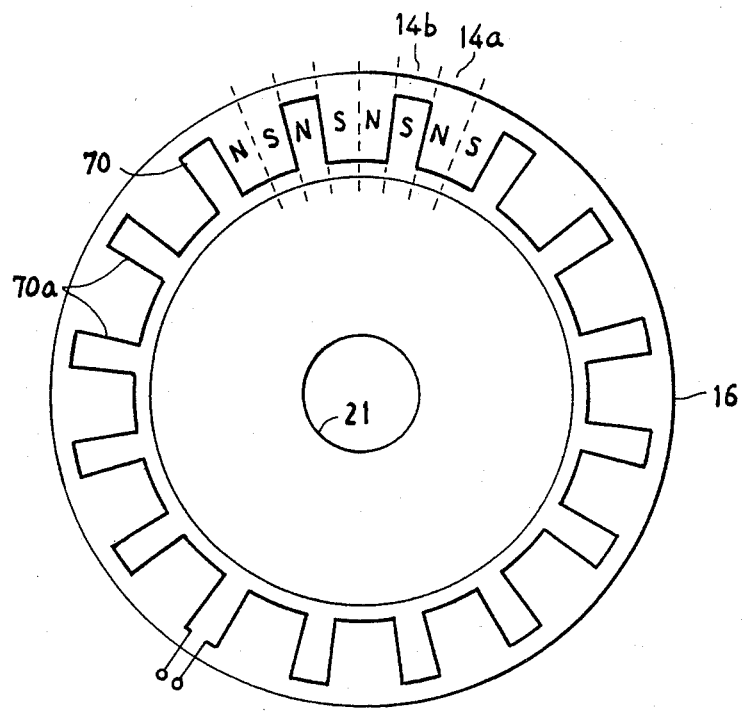
FIG. 9 is a plan view of an alternative embodiment of FIG. 7.
Figure 10:
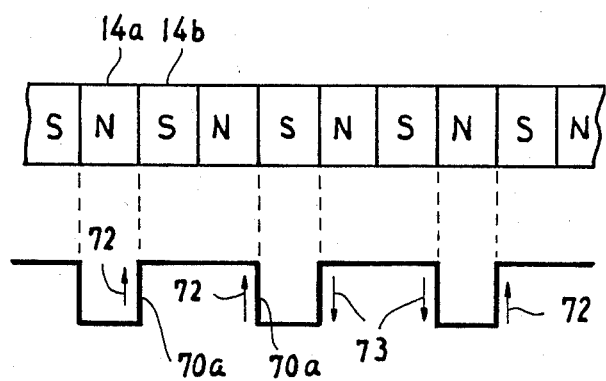
FIG. 10 is an illustration of a developed form of FIG. 9.

FIG. 9 is an illustration of an alternative form of the embodiment of FIG. 7. Coil 70 comprises multiple pairs of radially extending lateral components 70a, the lateral components of each pair being angularly spaced from each other by twice the angular spacing of pole faces 14a, 14b; the lateral components of adjacent pairs are spaced from each other by the angular spacing of the pole faces. The EMF voltages developed in the lateral components 70a of each pair have like polarities, but are opposite to the polarities of the voltage developed in adjacent pairs as indicated by arrows 72 and 73 in FIG. 10. Thus, voltage cancellation occurs in each pair.

What is claimed is:

1. A tachogenerator comprising:
    a rotor member having an axis, a stator member coaxial with the axis of the rotor member;
    one of said members having multiple equiangularly spaced-apart, alternately oppositely magnetized pole faces lying along a first path coaxial with the axis in a first surface; and
    the other member comprising an electrically insulative stationary support having a second surface opposed to said first surface, and a coil of magnetoresistance material formed on said second surface, said coil being arranged on said second surface along a second path extending concentric with said axis over an arc of at least 180 degrees in a spatially periodic structure having multiple angularly spaced-apart lateral components connected in series with intermediate longitudinal components, the lateral components and the multiple pole faces being arranged so that the lateral components cut flux from the pole faces as the rotor turns about the axis.

2. A tachogenerator as claimed in claim 1, wherein the angular spacing of said lateral components is an integral multiple of the angular spacing of said pole faces.

3. A tachogenerator as claimed in claim 1, further comprising means for supplying an electric current through said coil and developing voltage variations in said coil in response to the rotation of said rotor.

4. A tachogenerator as claimed in claim 1, wherein said first and second surfaces are flat, and said lateral components radially extend toward the axis.

5. A tachogenerator as claimed in claim 1, wherein said first and second surfaces are cylindrical and concentrical about the axis.

6. A tachogenerator as claimed in claim 1, wherein the lateral components of said coil are arranged at the same angular spacing as said pole faces.

7. A tachogenerator as claimed in claim 1, wherein said lateral components are formed in pairs, the lateral components of each pair being spaced apart from each other by an even integral multiple of the angular spacing of said pole faces.

8. A tachogenerator as claimed in claim 1, wherein said coil comprises a film deposited on said insulative support.

9. A tachogenerator as claimed in claim 1, further comprising a second coil of magnetoresistance material formed on said second surface of said support along a third path extending concentrically about the axis over an arc of at least 180 degrees in a spatially periodic structure having multiple angularly spaced lateral components connected in series with longitudinal intermediate components, the lateral components of said second coil being displaced with respect to the lateral components of the first-mentioned coil so that output variations developed in the second coil are 90 degrees out of phase with respect to output variations developed in the first coil.

10. A tachogenerator as claimed in claim 9, wherein the lateral components of said second coil are angularly displaced by one quarter of the angular spacing of said pole faces.

11. A tachogenerator as claimed in claim 9, wherein the lateral components of said first and second coils extend radially and are arranged in concentric circles.

12. A tachogenerator as claimed in claim 3, wherein said one member and said other member are respectively the rotor and stator.

13. A tachogenerator comprising:
a rotor member having an axis, a stator member coaxial with the axis of the rotor member;
one of said members having multiple equiangularly spaced-apart, alternately oppositely magnetized pole faces lying along a first path coaxial with the axis in a first surface;
the other member comprising an electrically insulative stationary support having a second surface opposed to said first surface, and a coil of magnetoresistance material formed on said second surface, said coil being arranged on said second surface along a second path extending concentric with said axis over an arc of at least 180 degrees in a spatially periodic structure having multiple angularly spaced-apart lateral components connected in series with intermediate longitudinal components; and
said pole faces and coil being arranged so that the lateral components and the multiple pole faces cause the lateral components to cut flux from the pole faces as the rotor turns about the axis and changes in resistance occur in the radial components and are combined in response to turning of the rotor to produce a total resistance change having a first frequency proportional to the rotor rotation speed and so that there is induced in the radial components voltages resulting from electromotive forces produced by magnetic field strength rates of changes on the coil, said induced voltages combining to produce a net voltage having a frequency that is one-half of said first frequency.

* * * * *